United States Patent
Baro Cabrero

(10) Patent No.: US 9,061,440 B2
(45) Date of Patent: Jun. 23, 2015

(54) BLADE FOR A CUTTING TOOL OF A CERAMIC CUTTING MACHINE

(71) Applicant: BELLOTA HERRAMIENTAS, S.A., Legazpia (Guipuzcoa) (ES)

(72) Inventor: Josep Baro Cabrero, Legazpia (ES)

(73) Assignee: Bellota Herramientas, S.A., Legazpia (Guipuzcoa) (ES)

( * ) Notice: Subject to any disclaimer, the term of this patent is extended or adjusted under 35 U.S.C. 154(b) by 0 days.

(21) Appl. No.: 14/102,739

(22) Filed: Dec. 11, 2013

(65) Prior Publication Data

US 2014/0165989 A1    Jun. 19, 2014

(51) Int. Cl.
*B28D 1/22* (2006.01)

(52) U.S. Cl.
CPC ...................................... *B28D 1/225* (2013.01)

(58) Field of Classification Search
CPC ...... B28D 1/225; B23D 45/02; B23D 45/021; B23D 45/027; B23D 47/025
USPC ........... 125/23.02, 13.01, 15.2; 451/547, 540, 451/541
See application file for complete search history.

(56) References Cited

U.S. PATENT DOCUMENTS

| | | | | |
|---|---|---|---|---|
| 1,511,016 A | * | 10/1924 | Prescott | 83/483 |
| 2,032,395 A | * | 3/1936 | Bley | 451/541 |
| 2,540,793 A | * | 2/1951 | Metzger | 125/15 |
| 3,207,016 A | * | 9/1965 | Huff | 83/887 |
| 4,534,827 A | * | 8/1985 | Henderson | 216/101 |
| 5,040,521 A | * | 8/1991 | Pourtau et al. | 125/23.02 |
| 5,331,877 A | * | 7/1994 | Ishii | 83/886 |
| 5,379,853 A | * | 1/1995 | Lockwood et al. | 175/428 |
| 5,915,370 A | * | 6/1999 | Casper | 125/13.01 |
| 6,269,994 B1 | * | 8/2001 | Harrington | 225/96.5 |
| 2003/0024522 A1 | * | 2/2003 | Ball | 125/15 |

* cited by examiner

*Primary Examiner* — George Nguyen
(74) *Attorney, Agent, or Firm* — Wenderoth, Lind & Ponack, L.L.P.

(57) ABSTRACT

Blade (1) for a cutting tool (2) of a ceramic cutting machine (3) comprising a disc-shaped geometry with a specific cutting diameter (H); with at least one conical surface (13) at each side of the cutting perimeter (12), the conical surfaces (13) closest to the symmetry axis (11) being truncated by two truncation planes perpendicular to the symmetry axis (11) of the blade (1), such that if the conical surfaces (13) closest to the symmetry axis (11) of the blade (1) are imaginarily extended towards its vertex, both define two tangency conical surfaces (15) with an imaginary sphere (16) the center of which is located on the symmetry axis (11) of the blade (1), where the ratio between the cutting diameter (H) of the blade (1) and the diameter (D) of said imaginary sphere (16) is equal to a number with a value comprised between 1.5 and 1.7.

2 Claims, 4 Drawing Sheets

BLADE FOR A CUTTING TOOL OF A CERAMIC CUTTING MACHINE

OBJECT OF THE INVENTION

The present invention relates to a blade for a cutting tool of a ceramic cutting machine that improves the stability and quality of the cut made on ceramic tiles by means of said cutting machines, due to its specific geometric features. Said cutting tools of ceramic cutting machines are commonly known as "scoring wheels" and the blade they comprise is commonly known as "scoring blade". The invention is applicable to the field of the metal tool manufacturing industry and the handling ceramic material industry.

BACKGROUND OF THE INVENTION AND TECHNICAL PROBLEM TO BE SOLVED

Current ceramic cutting machines that are manually operated typically comprise a bench where the tile or ceramic piece to be cut is placed, a positioning element of said tile in the bench, and a sliding lever that slides on rails, having a tool carrier element in which a cutting tool (or "scoring wheel") is inserted, which is in turn formed by a handle and a disc-shaped blade (or "scoring blade"). By means of the pressure exerted by the lever, a certain pressure is exerted by the scoring wheel on the tile to be cut. While exerting said pressure, and by advancing the lever with its tool carrier along the rails, a cut is progressively made on the tile.

In currently existing scoring wheel in the market, there is widespread geometric tolerance related to the elements making up the same, the scoring blade, scoring blade shaft and handle of the scoring wheel. The effect of these tolerances is that the scoring blade is not guided in a sufficiently precise manner when making the cut, resulting in observable oscillations and movements along its axis that affect the quality of the cut made and decrease its precision.

The present invention describes a blade for a cutting tool of a ceramic cutting machine with geometric features that improve the performance of conventional cutting tool blades of ceramic cutting machines, with the purpose of improving the guidance of the blade during the cut, thereby improving the precision, and therefore, the quality of the cut.

DESCRIPTION OF THE INVENTION

The present invention relates to a blade for a cutting tool of a ceramic cutting machine comprising a circular disc-shaped geometry with a symmetry axis.

The blade comprises a certain cutting diameter, H, and at least one conical surface at each side of the cutting perimeter of the blade, the revolution axis of said conical surfaces being the symmetry axis of the blade, said conical surfaces being truncated by two truncation planes that are perpendicular to the symmetry axis of the blade, the circular profile of a cylindrical hole passing through the blade is defined by the cutting line between said truncation planes and the conical surfaces, the revolution axis of the circular profile of the cylindrical hole is the symmetry axis of the blade.

If the conical surfaces closest to the symmetry axis of the blade are imaginarily extended towards its vertex, both conical surfaces define two tangency conical surfaces with an imaginary sphere the center of which is located on the symmetry axis of the blade.

The blade is characterized in that the ratio between the cutting diameter, H, of the blade and the diameter, D, of said imaginary sphere is equal to a number with a value comprised between 1.5 and 1.7.

In a preferred embodiment of the present blade for a cutting tool of a ceramic cutting machine, said blade is characterized in that the ratio between the cutting diameter, H, of the blade and the diameter, D, of the imaginary sphere is equal to twice the Golden Ratio, a condition that is mathematically expressed as follows:

$$\frac{H}{D} = 2 \times \varphi = 2 \times 1.6180339 \ldots \; (= 2 \times \text{golden ratio})$$

where:
H: cutting diameter of the blade;
D: diameter of the imaginary sphere;
φ: Golden Ratio

BRIEF DESCRIPTION OF THE FIGURES

The present description will be better understood in view of to the following figures.

Figure 1:
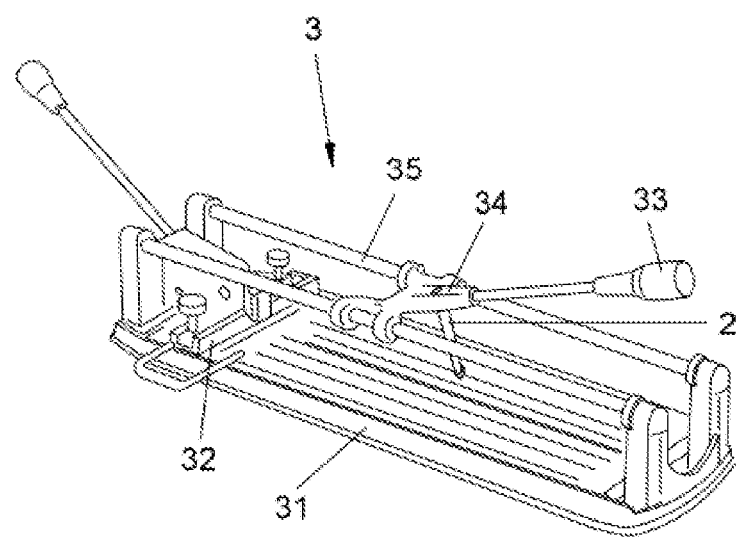
FIG. 1: ceramic cutting machine.

The numerical references used in the figures are listed below:
1. Blade
2. Cutting tool
3. Ceramic cutting machine
11. Symmetry axis
12. Cutting perimeter
13. Conical surface
14. Hole
15. Tangency conical surfaces
16. Imaginary sphere
17. Truncation plane
18. Cutting line
21. Handle
22. Shaft
31. Bench
32. Positioning element
33. Lever
34. Tool carrier
35. Rails Other References D. Diameter
H. Cutting diameter.

DETAILED DESCRIPTION

The present invention relates to a blade (1) for cutting tool (2) of a ceramic cutting machine (3).

FIG. 1 shows a perspective view of a ceramic cutting machine (3) specimen where the different typical elements that make it up are shown, namely: a bench (31) to place the ceramic tile desired to be cut, a positioning element (32) of said tile on the bench (31), a tilting lever (33) with a tool carrier (34), anchored to rails (35) on which the tilting lever (33) can slide with a longitudinal movement, and a cutting tool (2). Said cutting tool (2) is commonly referred to as "scoring wheel".

Figure 2:
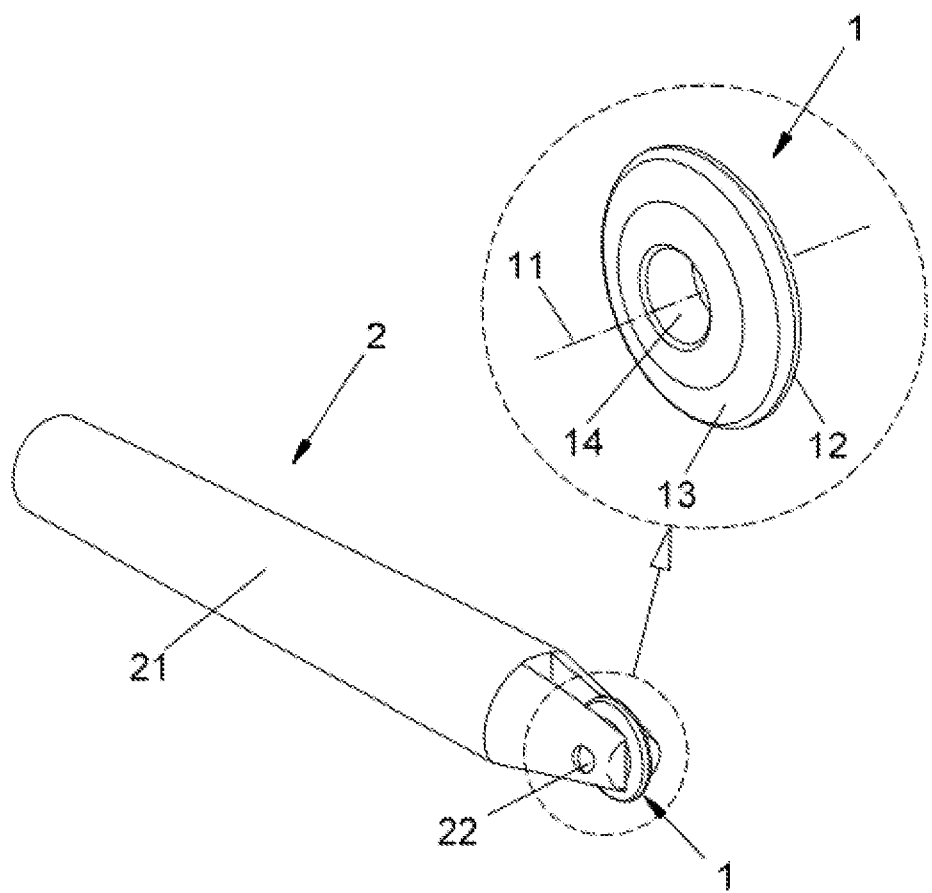
FIG. 2: cutting tool of a ceramic cutting machine, with a detail of the blade.

FIG. 2 shows the cutting tool (2) with the elements comprised therein. The cutting tool (2) comprises a circular blade (1) that rotates around a shaft (22) anchored to the handle (21) of the cutting tool (2). Said blade (1) is commonly referred to as "scoring blade". In FIG. 2 a detailed view of the blade (1) can be seen FIG. 3 shows a profile view of the blade (1) object of the invention.

Figure 4:
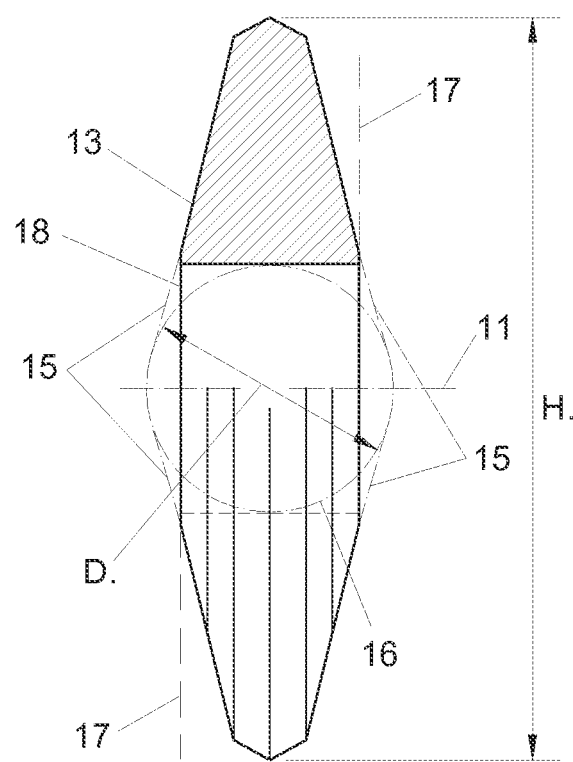
FIG. 4: profile quarter section view of an embodiment of the blade.

FIG. 4 shows in turn a profile quarter section view of an embodiment of the blade (1).

In a preferred embodiment of the present invention, the blade (1) comprises a geometry in the shape of a circular disc, provided with cutting edges and typically manufactured in a high-hardness material, the blade (1) in its central part being thicker than in its cutting perimeter (12).

Figure 3:
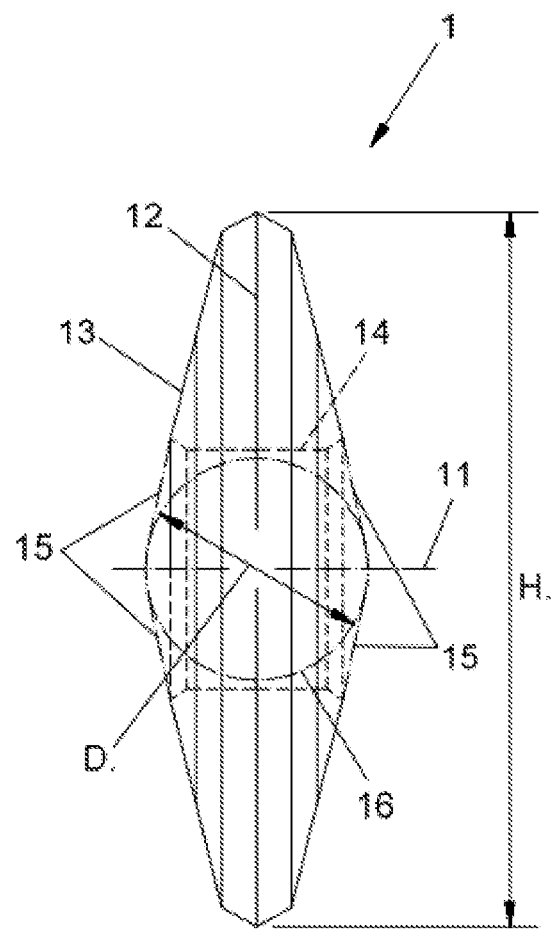
FIG. 3: profile view of an embodiment of the blade.

More specifically, the geometry of the blade (1), as shown in FIGS. 2 and 3, comprises a plurality of conical surfaces with different inclinations in their generatrixes in such a way that said conical surfaces progressively adapt their inclination, from the most acute to the most obtuse with respect to the symmetry axis (11) of the blade (1) as the distance from the cutting perimeter (12) of the blade (1) towards its center is traveled. The last of said conical surfaces (13), closest to the symmetry axis (11) of the blade (1), is truncated by two truncation planes (17) perpendicular to the symmetry axis (11) of the blade (1). The cutting line (18) of said truncation planes (17) with the conical surfaces (13) defines the circular profile of a cylindrical through-hole (14) of the blade (1), centered in the symmetry axis (11) of the blade (1), through which the rotary shaft (22) around which the blade (1) rotates when assembled in the cutting tool (2) set is introduced.

The geometric peculiarity of the present blade (1), which provides to the blade (1) its optimal properties to make high quality cuts, is the following: if the conical surfaces (13) closest to the center of the blade (1) are imaginarily extended towards its vertex, both define two tangency conical surfaces (15) with an imaginary sphere (16) the center of which is located on the symmetry axis (11) of the blade (1), where the ratio between the cutting diameter, H, of the blade (1) to twice the diameter, D, of said imaginary sphere (16), is a number comprised between 1.5 and 1.7. In the preferred embodiment of the present invention, said ratio is equal to the Golden Ratio.

This condition is mathematically expressed as follows:

$$\frac{H}{2 \times D} = \varphi = 1.61880339\ldots \text{ (golden ratio)}$$

where "H" symbolizes the cutting diameter of the blade (1) and "D" symbolizes the diameter of the imaginary sphere (16).

This geometric feature leads to the majority of the mass and volume of the blade (1) to be located around its symmetry axis (11), and the closest part to the cutting perimeter (12) of the blade (1) being thinner and lighter than its center. Given that the Golden Ratio is the one that defines the specific ratio in which the mass and volume of the blade (1) are distributed around its symmetry axis (11), an optimal stabilization is obtained, thereby reducing considerably the vibrations of the blade (1) during its rotation and pressurized displacement on the surface of the tile to be cut.

The present invention should not be limited to the embodiment described herein. Other embodiments introducing small modifications in the geometry of the blade (1) described herein can be made by experts in the art based on the present description. Consequently, the scope of the invention is defined in the following claims.

The invention claimed is:

1. A blade (1) for a cutting tool of a ceramic cutting machine comprising a geometry:
    in the shape of a circular disc with a symmetry axis with a certain cutting diameter;
    with at least one conical surface at each side of a cutting perimeter of the blade, a revolution axis of said conical surfaces being the symmetry axis of the blade, the conical surfaces closest to the symmetry axis being truncated by two truncation planes perpendicular to the symmetry axis of the blade, a circular profile of a cylindrical hole passing through the blade defining a cutting line between said truncation planes and the conical surfaces, a revolution axis of the cylindrical hole is the symmetry axis of the blade,
    such that if the conical surfaces closest to the symmetry axis of the blade are imaginarily extended towards its vertex, both define two tangency conical surfaces with an imaginary sphere which center is located on the symmetry axis of the blade,
    wherein the ratio between the cutting diameter of the blade and the diameter of said imaginary sphere is equal to a number which value is comprised between 1.5 and 1.7.

2. The blade for a cutting tool of a ceramic cutting machine according to claim 1, wherein the ratio between the cutting diameter of the blade and the diameter of the imaginary sphere is equal to twice the Golden Ratio, said condition that is mathematically expressed as follows:

$$\frac{H}{D} = 2 \times \varphi = 2 \times 1.6180339\ldots \ ( = 2 \times \text{golden ratio})$$

where:
H: cutting diameter of the blade;
D: diameter of the imaginary sphere;
φ: Golden Ratio.

* * * * *

UNITED STATES PATENT AND TRADEMARK OFFICE
CERTIFICATE OF CORRECTION

| | | |
|---|---|---|
| PATENT NO. | : 9,061,440 B2 | Page 1 of 1 |
| APPLICATION NO. | : 14/102739 | |
| DATED | : June 23, 2015 | |
| INVENTOR(S) | : Josep Baro Cabrero | |

It is certified that error appears in the above-identified patent and that said Letters Patent is hereby corrected as shown below:

ON THE TITLE PAGE:
Between the Prior Publication Data (item (50)) and the Int. Cl. (item (51)), insert:

-- (30) Foreign Application Priority Data:

December 18, 2012   (ES)   Spain ........................201231957 --

Signed and Sealed this
Twenty-second Day of December, 2015

Michelle K. Lee
*Director of the United States Patent and Trademark Office*